United States Patent [19]

Odlen et al.

[11] Patent Number: 4,583,173
[45] Date of Patent: Apr. 15, 1986

[54] WHEEL SLIP DETECTOR

[75] Inventors: Lars Odlen, Arlov; Bertil Olsson, Trelleborg, both of Sweden

[73] Assignee: Inventab Products AB, Lund, Sweden

[21] Appl. No.: 608,118

[22] Filed: May 8, 1984

[30] Foreign Application Priority Data

May 13, 1983 [SE] Sweden ................... 8302732

[51] Int. Cl.⁴ ................... G06F 15/20; B60T 8/82
[52] U.S. Cl. ................... 364/426; 180/197; 303/96; 361/238; 340/52 R
[58] Field of Search ............ 180/197; 364/426, 424; 303/96; 361/238; 340/52 R

[56] References Cited

U.S. PATENT DOCUMENTS

| | | | |
|---|---|---|---|
| 3,764,817 | 10/1973 | Nakamura et al. | 361/238 |
| 3,776,355 | 12/1973 | Scherenberg | 180/197 |
| 3,893,535 | 7/1975 | Burckhardt et al. | 303/96 |
| 4,344,139 | 8/1982 | Miller et al. | 180/197 |
| 4,395,761 | 7/1983 | Sato et al. | 364/426 |

Primary Examiner—Craig R. Feinberg
Assistant Examiner—David A. Okonsky
Attorney, Agent, or Firm—Yount & Tarolli

[57] ABSTRACT

Apparatus is disclosed for detecting wheel slip of a driven wheel with respect to a surface. A magnet is fastened to the wheel and a sensor coil is fixedly mounted adjacent the path of rotation of the magnet. The sensor generates one electrical pulse each time the associated magnet rotates past it. Thus, the time of rotation of the wheel corresponds to the time interval between the pulses provided by the coil. The rotation time of the driven wheel is compared against the rotation time of a similarly equipped free rolling wheel to detect wheel slip. A wheel slip indication is given if the difference in wheel rotation times is greater than a selected limit. Acceleration of the wheels may interfere with the wheel slip detection, because the rotation times of the driven and free rolling wheels are not measured at precisely the same time. To account for this, acceleration over the rotation time measurement interval is itself measured and used to increase the allowable difference in wheel rotation times before a slip indication is given.

13 Claims, 7 Drawing Figures

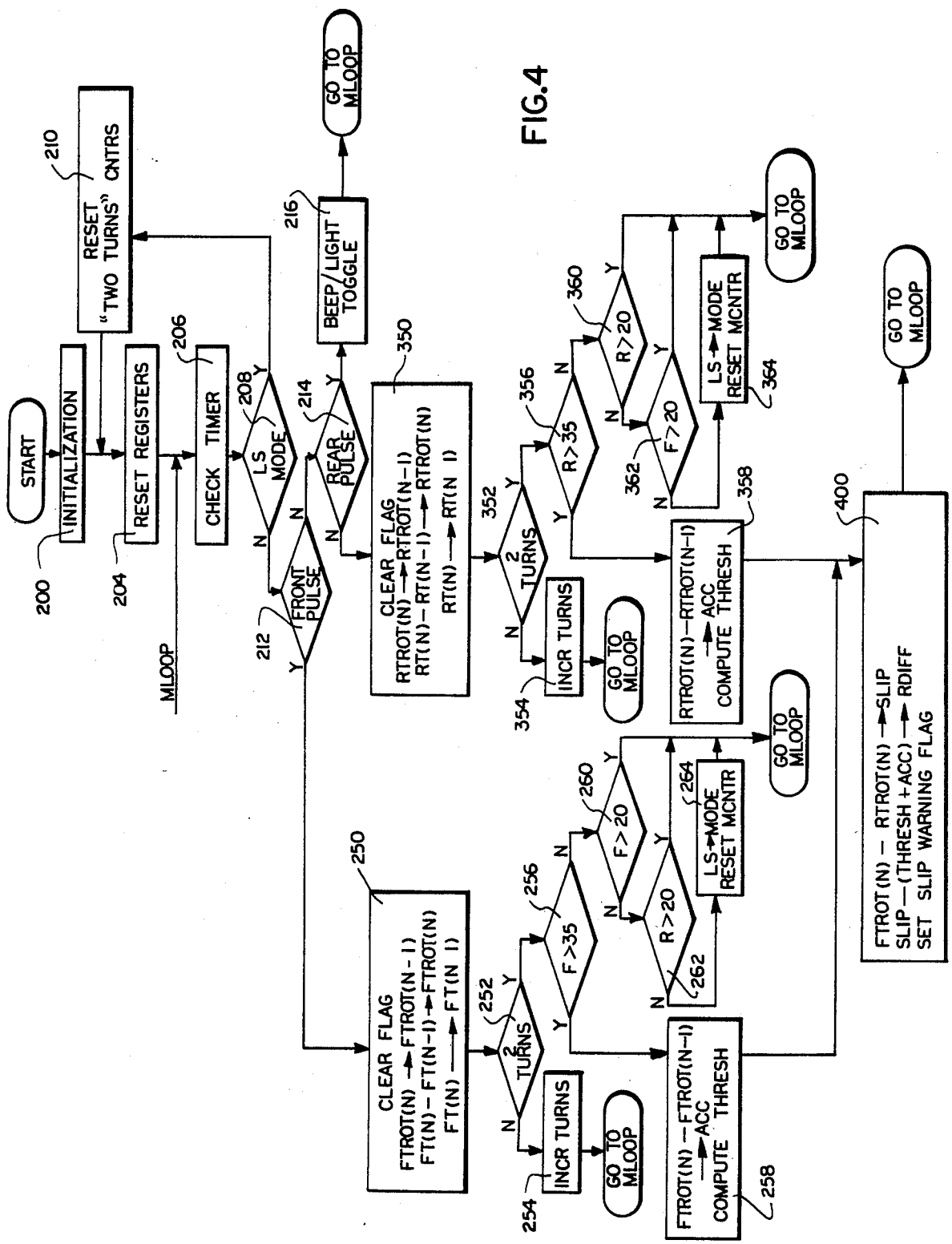

WHEEL SLIP DETECTOR

BACKGROUND AND FIELD OF THE INVENTION

The present invention relates to method and apparatus for detecting the slip of a driven wheel with respect to surface with which the driven wheel is in contact. The present invention more particularly relates to a slip detecting system wherein the rotation of a driven wheel is compared with the rotation of a similar free rolling wheel also in contact with the same surface.

There are a number of situations in which it is desirable to both detect and indicate slip of a driven wheel with respect to a surface against which the wheel runs. Detection of wheel slip is particularly important in connection with motor vehicles, for example, since the loss of traction accompanying the wheel slip may lead to a complete loss of control of the vehicle, resulting in property damage and/or personal injury. If the driver is aware of the slippery nature of the road surface, he can reduce the speed of the vehicle, thereby reducing the danger of loss of control. The majority of experienced drivers can detect extremely slippery road conditions early enough to prevent loss of control of the vehicle. In some situations, however, the road surface may be slippery enough to heighten the risk of high speed travel while still being modest enough to be undetectable by the motor vehicle operator. It would be desirable if some means could be provided for detecting and indicating slippery road conditions to the driver.

There are other situations in which it is desirable to detect the slip of a driven wheel with respect to a surface against which the wheel runs. In agricultural equipment, for example, often heavy implements are driven by belts connected between a driven pulley and a free rolling pulley. If the implement becomes jammed, the driven wheel may begin to slip extensively with respect to the belt, thereby producing substantial friction heat and presenting a serious risk of combustion. Indeed, a number of combines have been completely lost through fires originating in this fashion. It would therefore be desirable to provide some means for detecting and indicating the presence of slip between the driven wheel (i.e., the driven pulley) and the belt.

In the past, some systems have been devised for providing wheel slip detection. In one such system, a special disk containing numerous ridges or dents around its perimeter is affixed to a vehicle wheel whose slip is to be detected. A second, similar disk is affixed to a second, free rolling wheel of the vehicle. Sensors are then disposed adjacent each dented disk for detecting the rotation of the respective wheels. The sensors each provide one output pulse each time a dent passes the sensor. The rate of occurrence of the sensor pulses is therefore directly related to the speed of rotation of the wheel to which the disk is attached. Wheel slip can be detected by comparing the repetition rates of the pulses at the outputs of the two sensors.

Unfortunately, dented disks are difficult and expensive to manufacture, and are likewise difficult to mount upon existing vehicles. The total cost of purchasing and installing the system tends to be so high, in fact, that ordinary drivers are unwilling to spend the money necessary to procure and mount such a system.

SUMMARY OF THE INVENTION

The present invention provides a system for detecting wheel slip which is substantially less expensive to construct and easier to install than prior systems. In the present system, only one sensible element (e.g., a magnet) is affixed to the driven wheel, a similar magnet being mounted on the free rolling wheel. Sensors (e.g., inductive coils) are mounted adjacent the wheels at such locations that the magnets rotate past the coils once in each revolution of the wheel. The magnets thus induce one pulse across the sensor coil for each complete revolution of the wheel to which the magnet is attached. The time interval between successive pulses appearing at each sensor corresponds to the time of rotation of the associated wheel, and is therefore inversely proportional to the speed of the vehicle. Wheel slip can thus be detected by comparing the time interval between pulses from the driven wheel sensor with the time interval between pulses from the free rolling wheel sensor.

Since the times of occurrence of the front and rear wheel sensor pulses are usually different, the measurement of the time interval between pulses of one wheel will take place at a different time than will the measurement of the time interval between pulses of another wheel. This lack of correlation of the times of measurement is problematical, however, since the vehicle speed may change markedly during the interval between two measurements. A difference between the measured times of rotation of the driven and free rolling wheels may thus be due to acceleration of the vehicle during the time between measurements, rather than due to wheel slip. In accordance with one aspect of the present invention, the wheel slip detection process is corrected to account for vehicle acceleration. Vehicle acceleration is detected, and the detected acceleration is then used to modify either the wheel slip threshold or the wheel slip indication, itself.

BRIEF DESCRIPTION OF THE DRAWINGS

The foregoing and other objects and advantages of the present invention will become more readily apparent from the following detailed description, as taken in conjunction with the accompanying drawings, wherein:

FIG. 4 is a flow chart illustrating the main program executed by the microcomputer associated with the circuitry of FIG. 3;

DETAILED DESCRIPTION

Figure 1:
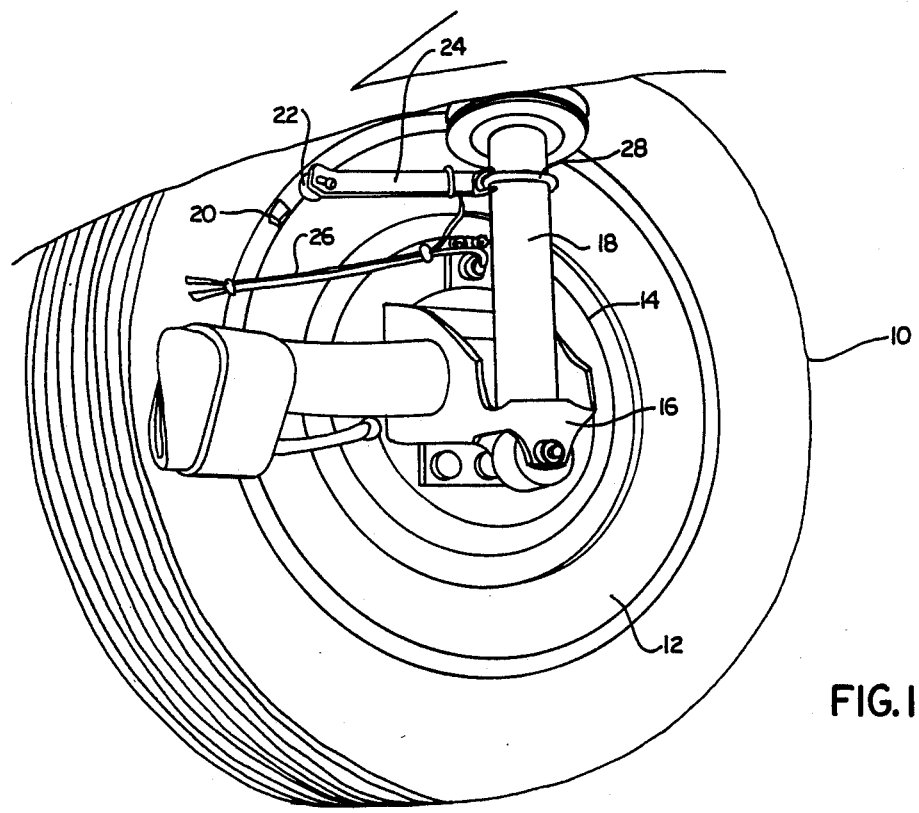
FIG. 1 is a schematic representation showing the manner of mounting of the rotation sensors in accordance with the present invention.

FIG. 1 illustrates the manner in which the sensing elements may be attached to a standard passenger vehicle. FIG. 1 is more specifically a representation of the rear suspension of a 1981 Volkswagen Jetta, however the sensor elements can of course be mounted in an entirely equivalent fashion on the suspension of virtually any wheeled vehicle currently in use today. In FIG. 1, a rubber tire 10 is mounted on a metal wheel or rim 12. The wheel or rim 12 is bolted to a brake/bearing assembly 14. The brake/bearing assembly is secured to a support beam 16, which is in turn affixed to the frame of a vehicle through suitable shock insulating components including a shock absorber 18.

The rotation sensor includes a magnet 20 and a magnetic coil 22. The magnet 20 is attached to the perimeter lip of the wheel 12 by a suitable adhesive (e.g., epoxy cement, double-faced contact tape, etc.), and the magnetic coil 22 is suspended over the perimeter of the wheel by a bracket 24. The bracket 24 is fastened to the shock absorber 18 by a conventional U-bolt 28. The coil 22 will preferably be positioned immediately adjacent the path of rotation of the magnet 20, however the exact axial spacing between the coil 22 and the path of magnet 20 is not critical. The sensor will operate properly with axial spacings as great as an inch.

The sensor coil and magnet are inexpensive, and can be mounted in the illustrated positions with little difficulty, and without removing the tire and wheel. The positioning of the magnet upon the perimeter lip of the wheel 12 is not critical. The position of the sensor coil 22 relative to the rotational path of the magnet 20 can readily be adjusted by sliding the U-bolt 28 up and down on the shock absorber 18, and by rotating the U-bolt and mounting bracket 24 around the shock absorber. Moreover, the mounting stud projecting from the sensor coil 22 is carried in an elongated slot in the bracket 24, and can be slid back and forth within the slot to obtain optimum adjustment of the position of the sensor coil 22.

In other systems, wherein plural sensible elements are disposed around the perimeter of the wheel, the spacing of the elements is quite important. In such systems, the interval between pulses is dependent not only upon the rotational speed of the wheel, but also upon the spacing between the two sensible elements which produce those pulses. The spacing between the various sensible elements therefore should be the same, or otherwise it would not be known whether a change from one time interval to the next were due to a change in the velocity of the vehicle or to a nonuniformity in the spacing between the various sensible elements.

In the present system, this problem does not arise. Since there is a single magnet mounted on the wheel, each pulse appearing at the output of the sensor coil 22 is caused by the passage on the same point on the wheel. It is therefore known that the interval between pulses in each case corresponds to the exact same degree of rotation (i.e., one full turn) of the wheel 10.

A similar magnet and coil are mounted to a front wheel of the vehicle. Preferably, the sensors on the front and rear of the car are mounted on the same side of the vehicle. Thus, for example, the sensors could be mounted on the front right and rear right wheels of the car. The vehicle to which the sensors are attached may be either a front wheel drive, or rear wheel drive car. For the purposes of the discussion which follows, however, it will be presumed that the vehicle to which the sensors are attached is a front wheel drive car. The front wheel is thus a driven wheel and the rear wheel is the free rolling wheel.

Figure 2:
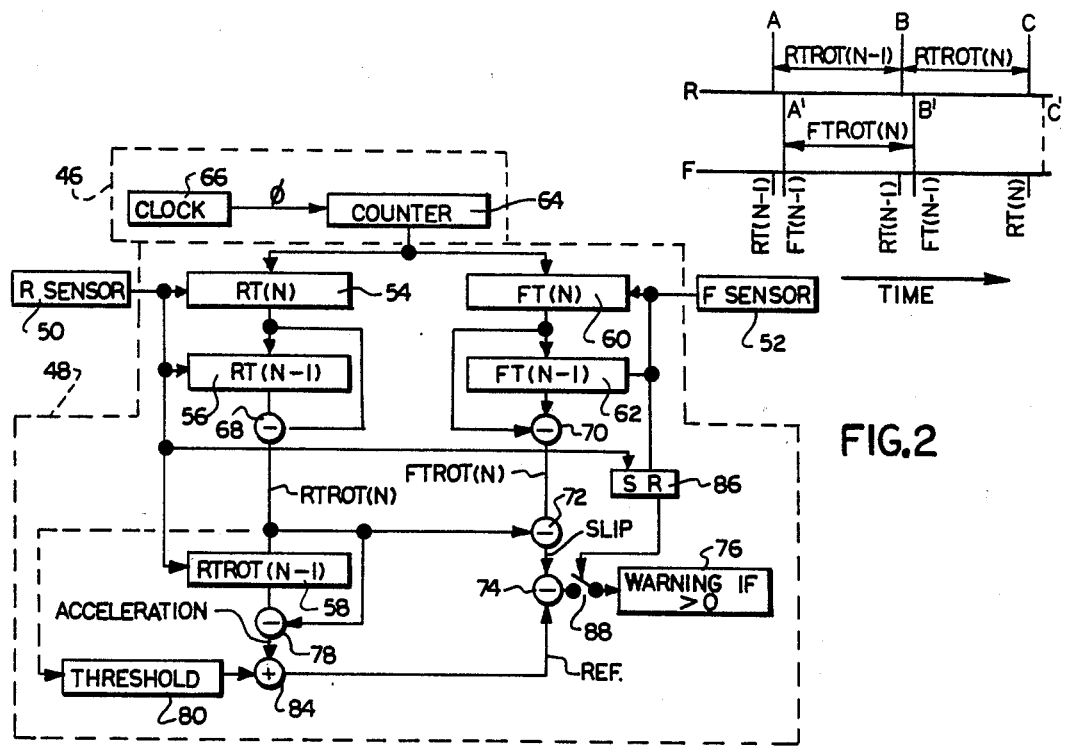
FIG. 2 is a block diagram of one embodiment of the circuitry associated with the present invention.

The two ends of each sensor coil 22 are connected to electronic circuitry through electrical cables 26 (FIG. 1). The electronic circuitry (not shown in FIG. 1), determines, and warns of, wheel slip by measuring and comparing the time intervals between consecutive sensor pulses. FIG. 2 is a simplified schematic of one embodiment of electronic circuitry which could be utilized in conjunction with the sensors to provide the slip warning.

In FIG. 2 and the figures which follow, various system elements and firmware steps refer to certain variable names used to identify system variables. The table which follows identifies the variables, and is included for reference purposes.

TABLE I

| | |
|---|---|
| MCNTR | Main counter |
| RTROT (N) | Rear wheel time of rotation (new) |
| RTROT (N-1) | Rear wheel time of rotation (old) |
| RT (N) | MCNTR value at rear wheel pulse (new) |
| RT (N-1) | MCNTR value at rear wheel pulse (old) |
| FTROT (N) | Front wheel time of rotation (new) |
| FTROT (N-1) | Front wheel time of rotation (old) |
| FT (N) | MCNTR value at front wheel pulse (new) |
| FT (N-1) | MCNTR value at front wheel pulse (old) |
| ACC | Wheel acceleration |
| SLIP | Difference in rotation times of wheels |
| FCNTR | Front wheel low speed counter |
| RCNTR | Rear wheel low speed counter |
| THRESH | Slip warning threshold |
| FLAGS | Various system flags |

In FIG. 2, the rear and front wheel sensors are indicated at 50 and 52. The sensors 50 and 52 of FIG. 2 each include a sensor coil and suitable signal conditioning circuitry for conditioning the output signal pulses provided by the coils in response to each passage of an associated magnet. Each sensor 50 and 52 therefore provides a singular, well defined pulse each time its associated magnet passes by.

The circuitry of FIG. 2 generally includes a clock circuit 46 for generating a two-byte digital word which indicates and changes with the current time, and a time interval processing circuit 48 responsive to the output of the clock circuit 46 and the sensor outputs for measuring and comparing the rotation times of the front and rear wheels.

The processing circuit 48 includes five digital registers, each capable of storing one digital word. The output line of rear sensor 50 is connected to the "load" input of three of the digital registers 54, 56 and 58, and the output of the front sensor 52 is similarly connected to the "load" input of the remaining two digital registers 60 and 62. Each time a pulse occurs on the "load" input of one of the five registers, that register latches and thus stores the digital word being provided in parallel to its input. The stored number is continuously provided at the register output. The parallel input of register 56 is taken from the parallel output of register 54, hence register 56 will store the value previously contained in register 54 upon the occurrence of a sensor pulse. Similarly, the parallel input of register 62 is taken from the parallel output of register 60, hence register 62 will respond to each sensor pulse by storing the value previously contained in register 60. The inputs to registers 54 and 60, on the other hand, are both connected to the parallel output of the clock circuit 46.

In FIG. 1, clock circuit 46 is comprised of a free running counter 64. Free running counter 64 is periodically incremented by pulses provided by a clock oscillator 66. Clock oscillator 66 provides clock pulses at a fixed frequency which is substantially greater than the highest expected frequency of pulses at the output of either of the sensors 50 or 52, whereby the counter 64 will increment through at least several hundred different values between each pair of consecutive sensor output pulses.

Each time a sensor pulse occurs, the current count contained within the counter 64 is loaded into a respective register 54 or 60. Register 54, therefore, may be considered to contain a number RT(N) identifying the time of occurrence of the most recent rear wheel sensor pulse. At the same time that the current count contained within counter 64 is loaded into register 54, the value previously stored within register 54 is loaded into register 56. Register 56 therefore contains the counter reading $RT(N-1)$ at the time of occurrence of the rear wheel sensor pulse just prior to the most recent pulse. The difference between the numbers stored in registers 54 and 56 represents the number of pulses of clock 66 which had transpired between the two rear wheel sensor pulses, and therefore is directly related to the most recent time of rotation RTROT(N) of the rear wheel. A digital subtractor circuit 68 is connected to the outputs of the two registers 54 and 56, and develops the difference signal corresponding to the time of rotation of the rear tire. Registers 60 and 62 contain similar information relating to the front wheel, and have their outputs connected to a subtractor circuit 70. The output of subtractor circuit 70 is a digital word representative of the time of rotation FTROT(N) of the front wheel.

The outputs of the two subtractor circuits 68 and 70 are subtracted from one another in a third digital subtractor circuit 72. The resulting difference signal corresponds to the difference in rotation times of the front and rear wheels, and therefore corresponds with the degree of wheel slip. A subtractor circuit 74 subtracts a reference signal from the slip signal, and provides an output signal which will be negative as long a the reference signal is greater in magnitude than the slip signal. The output of the subtractor circuit 74 is applied to a warning circuit 76. Warning circuit 76 provides a warning indication if the output signal provided by the subtractor circuit 74 becomes greater than zero. Thus, whenever the slip signal represented at the output of subtractor 72 becomes greater than the reference signal, a warning indication will be provided to the vehicle operator.

The timing relationship between the various values stored in the four registers 54, 56, 60 and 62 is represented in the graph associated with FIG. 2. In the graph, the signal from sensor 52 is designated as signal "F" (front) and the signal from sensor 50 is designated as signal "R" (rear). Pulse C of signal R is the most recent pulse, and its time of occurrence RT(N) is stored in register 54. The times of occurrence of the other rear and front wheel pulses are indicated on the graph.

From the graph, it can be seen that the front and rear wheel pulses do not occur at the same time. In fact, the phase relationship between the front and rear wheel pulses will change, due primarily to wheel slip. Since the front and rear wheel pulses are not aligned in time, however, the times of wheel rotation RTROT and FTROT are measured over different time intervals. In the example illustrated in the graph of FIG. 2, for example, the front wheel time of rotation FTROT(N) actually was measured over approximately the same time interval over which the previous rear wheel time of rotation $RTROT(N-1)$ was measured. If vehicle speed has changed, however, RTROT(N) will be different than $RTROT(N-1)$. Thus, in the example, FTROT(N) should more properly be compared with $RTROT(N-1)$ since those measurements were more closely aligned in time. At another time, however, the timing relationship between front and rear wheel pulses may be such that FTROT(N) is measured over an interval nearly coincident with RTROT(N). In that circumstance FTROT(N) should be compared with RTROT(N) instead of $RTROT(N-1)$.

It can be concluded, however, that in the absence of slip FTROT(N) should have a value somewhere between the values of RTROT(N) and $RTROT(N-1)$. If RTROT(N) is equal to $RTROT(N-1)$, there is no uncertainty in the expected no-slip value of FTROT(N). If RTROT(N) and $RTROT(N-1)$ are different, however, an uncertainty is added as to the correct no-slip value of FTROT(N). The uncertainty is directly related to the difference between RTROT(N) and $RTROT(N-1)$, and is thus directly related to change in vehicle velocity (i.e., vehicle acceleration). This uncertainty is accounted for in the FIG. 2 embodiment by adding the vehicle acceleration to the alarm warning reference level.

Acceleration is determined by subtracting the present time of rotation of the wheel from the immediately preceding time of rotation for the same wheel. The immediately preceding time of rotation is stored in a register 58 having its parallel input lines connected to the output of subtractor 68. Register 58 is loaded by the same output pulses of sensor 50 which load registers 54 and 56. Thus, with each pulse, the contents of register 54 are loaded into register 56, and the output signal of subtractor 68 is loaded into register 58. Subtractor circuit 78 subtracts the output of subtractor circuit 68 (i.e., the most recent time of rotation of the rear wheel) from the output of register 58 (i.e., the time of rotation of the rear wheel immediately preceding the current time of rotation) to thereby provide an acceleration signal.

The acceleration signal appearing at the output of signal subtractor 78 is used to modify a threshold signal provided by threshold circuit 80. Threshold circuit 80 provides a threshold signal which preferably will have a value dependent upon the most recent time of rotation of the free rolling (rear) wheel of the vehicle. If a fixed threshold signal were instead provided, the threshold would seem higher at high speeds than at low speeds because the total time of rotation of a tire diminishes with increasing vehicle speed. Thus a fixed threshold would be a greater precentage of the total time of rotation at low speeds than at high speeds. A suitable threshold value can be derived by dividing down the signal at the output of subtractor 68. In the embodiment shown in FIG. 2, the threshold signal comprises the higher ordered bits of the digital word appearing at the output of subtractor 68. The four lowest ordered bits are discarded, thus effectively dividing the signal at the output of subtractor 68 by a factor of 16. The resulting threshold signal corresponds to a fixed percentage (approximately 6%) of the output of the signal subtractor 68.

An adder circuit 84 additively combines the acceleration signal at the output of subtractor 78 with the threshold signal provided by threshold circuit 80. The result of the addition process is a reference signal which is essentially a fixed percentage of the rotation time of the free rolling wheel, but which is increased by the amount of acceleration of the free rolling tire to account for changes in the speed of the vehicle during the interval between successive rotation time measurements. Thus, during the portion of the time in which the vehicle is accelerating or decelerating, the threshold is increased or reduced by an amount dependent upon the amount of acceleration or deceleration.

It will be noted that the relationships shown in the graph associated with FIG. 2 no longer apply once the next front wheel pulse (C') arrives. After C', FTROT(N) is moved up to the interval between B' and C', and hence it should be compared against RTROT(N) and RTROT(N+1). RTROT(N+1) cannot yet be determined, however, since the next rear wheel pulse has not yet been received. The circuit of FIG. 2 solves this problem by disabling the output of subtractor 74 until the next rear wheel pulse arrives.

In FIG. 2, a set/reset flip-flop 86 is controlled by the front and rear wheel sensor pulses. The output of the flip-flop, in turn, controls a solid state switch 88 located between subtractor 74 and warning circuit 76. Flip-flop 86 is reset by each rear wheel pulse and set by each front wheel pulse, hence the switch 88 is only closed for the interval after a rear wheel pulse and before a front wheel pulse. Thus, the warning circuit 76 is connected to the subtractor 74 only when FTROT(N) falls between RTROT(N) and RTROT(N−1), as illustrated in the graph associated with FIG. 2. Warning circuit 76 includes a conventional attack/release circuit for sustaining a warning initiated by the intermittent closure of switch 88.

In the next embodiment (FIG. 3), the problem is solved somewhat differently. Thus, the FIG. 3 embodiment functions such that, after a rear wheel pulse, wheel slip is compared against a threshold adjusted in accordance with rear wheel acceleration, but after a front wheel pulse, wheel slip is compared against a threshold adjusted in accordance with front wheel acceleration.

Figure 3:
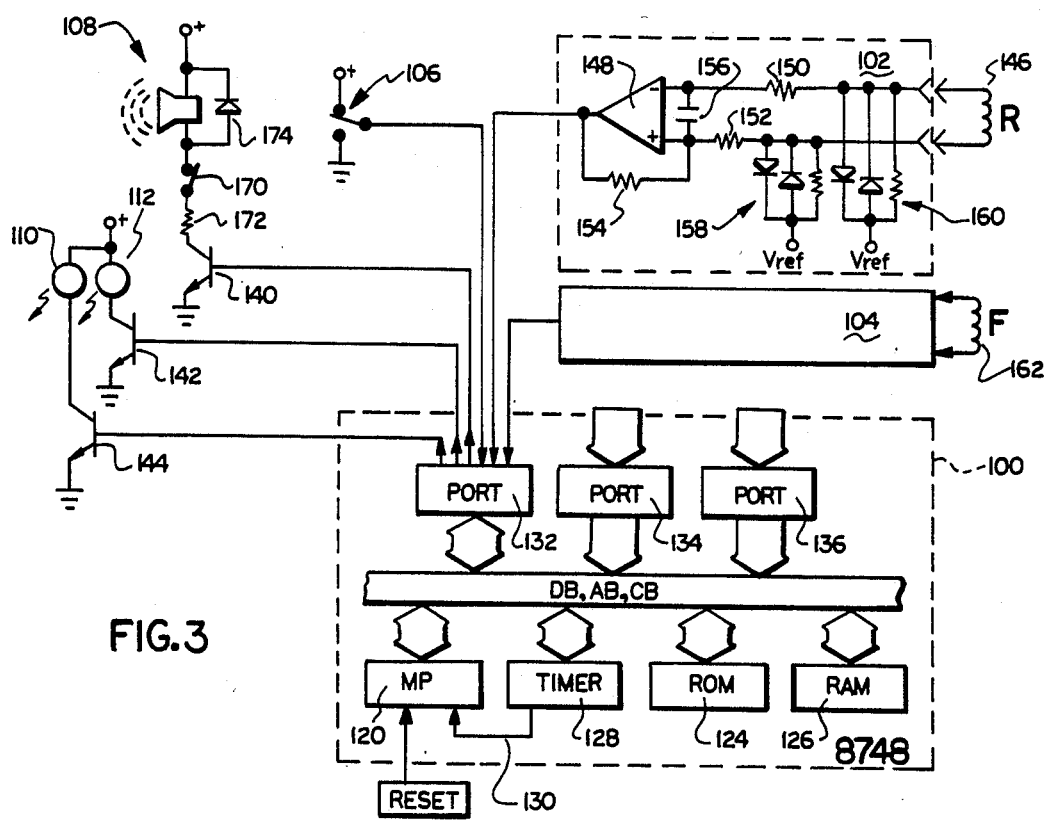
FIG. 3 is a circuit diagram of a second, and currently preferred, embodiment of the circuitry associated with the present invention.

FIG. 3 is a circuit schematic of a second, presently preferred embodiment of a circuit for use in the wheel slip detector in accordance with the present invention. The circuit consists of little more than a single chip microcomputer 100, two sensor coil signal processing circuits 102 and 104, a sensitivity switch 106, and an indicating buzzer 108 and two indicator lamps 110 and 112. The various registers shown in the FIG. 2 embodiment are also used in the FIG. 3 embodiment, but are represented by various data storage locations within the microcomputer 100. The loading of the data into the registers and the processing of the data within the registers by subtraction, addition, etc., however, are all accomplished through firmware permanently resident within the microcomputer 100. The firmware will be described hereinafter with reference to FIGS. 4–7.

The microcomputer 100 may take any conventional form, but in the embodiment described comprises a model 8748 single chip microcomputer, manufactured and sold by Intel Corporation of Santa Clara, Calif. A detailed description of the contents of the 8748 microcomputer, its various hardware and software functions, and a complete description of its instruction set is contained within the Intel Microcontroller Handbook, first published by Intel Corporation in 1983.

The heart of the microcomputer 100 is a microprocessor 120. The microprocessor 120 communicates with the remainer of the elements of the microcomputer through a system bus including a conventional data bus, address and control bus. Instructions for operation of the microprocessor (known as "firmware") are stored within a read only memory (ROM) 124. Working storage of variable values is provided by 64 bytes of random access memory (RAM) 126. Both ROM 124 and RAM 126 are connected to the microprocessor 120 through the system bus. In a conventional and well known fashion, the microprocessor executes the program stored in the read only memory by first addressing the first location within the read only memory, executing that instruction, and then proceeding on to the next instruction. The microprocessor proceeds to read and execute instructions in sequence from the read only memory 124, jumping out of sequence only when a particular instruction directs the microprocessor to continue program execution at some other address within the read only memory.

A timer 128 is included in the microcomputer. The timer is essentially just a free running counter, and is incremented by a clock signal derived from the clock (not shown) which operates the microprocessor 120. The timer 128 is loaded with an initial count by the microprocessor 120, and thereafter increments the count periodically in accordance with the clock signal. When the timer overflows, it places an interrupt signal on the interrupt line 130, thereby advising the microprocessor that the selected interval of time has elapsed. The length of time necessary for the timer 128 to overflow is directly related to its initial value, and is therefore directly programmable by the microprocessor 120.

Three ports 132, 134, and 136 provide interfaces between the system bus and devices external to the microcomputer 100. Port 132 includes output lines which are essential bidirectional, hence some lines of the port may be used as inputs, while others are simultaneously used as outputs. In the embodiment of FIG. 3, two of the lines leading to port 132 are taken from the outputs of the sensor signal processors 102 and 104, whereas the third is taken from the sensitivity switch 106. Three other lines from the port 132 are applied to the driver transistors 140, 142, and 144 respectively associated with the buzzer 108 and indicator lamps 112 and 110. The microprocessor 120 can read both the sensor output signals and the sensitivity switch position by reading port 132. Similarly, the microprocessor 120 can control the states of the driving transistors 140, 142 and 144 by writing data into the port 132.

Ports 134 and 136 of the microcomputer 100 are hard wired with data input values used to access a lookup table and thereby retrieve a threshold value for use in the processng of the wheel slip information. Thus, the sensitivity of the wheel slip detector may be changed by reconnecting the input lines to the ports 134 and 136 in a different manner. This will be described in greater detail hereinafter with respect to FIG. 6.

In FIG. 3, the sensor coil 146 associated with the rear (free rolling) wheel is connected to a signal processing circuit 102. In the signal processing circuit 102, each end of the sensor coil 146 is connected to a corresponding input of a signal comparator circuit 148. One end of the coil 146 is connected to the inverting input of comparator 148 through a resistor 150, and the other end of the coil 146 is connected to the noninverting input of the comparator through a similar resistor 152.

Comparator 148 provides an output signal which is high (i.e., approximately equal to the positive supply voltage) when the signal on its noninverting input is greater than the signal on its inverting input. The comparator output signal is low (approximately equal to signal ground), however, whenever the signal on its inverting input is greater than the signal on its noninverting input. A positive feedback resistor 154 is connected between the output of signal comparator 148 and its noninverting input so as to provide the switching characteristics of the comparator whith some degree of hysteresis. A capacitor 156 is connected across the two inputs to the signal comparator to suppress noise on the comparator inputs.

The signal coil 146 is connected to the inputs of the signal comparator 148 in such a fashion that, each time the magnet passes the coil, the signal on the noninverting input of the signal comparator goes positive relative to the signal of the inverting input, after which it goes negative relative to the input on the inverting input. When the input signal provided by the coil 146 goes positive, the output of signal comparator 148 is forced high. When shortly thereafter the input signal goes negative, however, the output of the signal comparator 148 is forced to return to a low signal level. Thus, the output of signal comparator 148 is normally low, but switches high for a brief period of time each time the magnet passes the coil 146.

The input lines to the signal comparator 148 are protected by signal clipping circuits 158 and 160. The clipping circuit 158 includes two diodes and a resistor, all connected in parallel between one end of the coil 146 and a reference voltage $V_{ref}$. The diodes are connected anti-parallel to one another. Signal clipping circuit 160 is similar to signal clipping circuit 158, although the three parallel elements are instead connected between the other lead of the coil 146 and the reference voltage $V_{ref}$. The purpose of the signal clipping circuits 158 and 160 is to protect the signal comparator 148 by preventing the input signals on the two input lines from rising to levels which could damage the comparator. This form of signal protection is desirable since the output of the coil 146 could otherwise reach quite high levels at high vehicle speeds. The signal clipping circuits, however, prevent the signals on the input lines to the signal comparator from deviating from the reference voltage $V_{ref}$ by more than approximately 0.7 volt. The reference voltage $V_{ref}$ is established by a voltage divider (not shown) connected between the positive supply rail and ground.

The signal processing circuit 104 associated with the front inductive coil 162 is similar to signal processing circuit 102. Thus, signal processing circuit 104 provides an output which is normally low, but which switches high briefly whenever the magnet on the front wheel passes the inductive coil 162.

Slip warning buzzer 108 is controlled by an output of port 132 through a driver transistor 140. In the embodiment shown in FIG. 3, the driver transistor 140 has its collector-emitter current path connected across the supply voltage in series with the buzzer 108, a manual switch 170, and a current limiting resistor 172. A free wheeling diode 174 is connected across the coil 108. Normally, the switch 170 is closed such that power is supplied to the buzzer 108 whenever the transistor 140 is turned on. The switch 170 may be manually opened by the operator to disable the audible warning, however.

The two indicator lamps 110 and 112 are similarly controlled by outputs of the port 132 through driving transistors 142 and 144. The indicator lamps 110 and 112, however, do not require or include free wheeling diodes, disabling switches, or current limiting resistors.

The sensitivity switch 106 comprises a single pole double-throw manual switch having one contact connected to the positive supply rail and the other contact connected to ground. The microcomputer 100 responds to the position of the switch 106 by establishing either a high or a low threshold level. Thus, the operator can manually control the threshold point at which the indicator buzzer and lamps are actuated by selecting the corresponding position of the switch 106.

Figure 7:
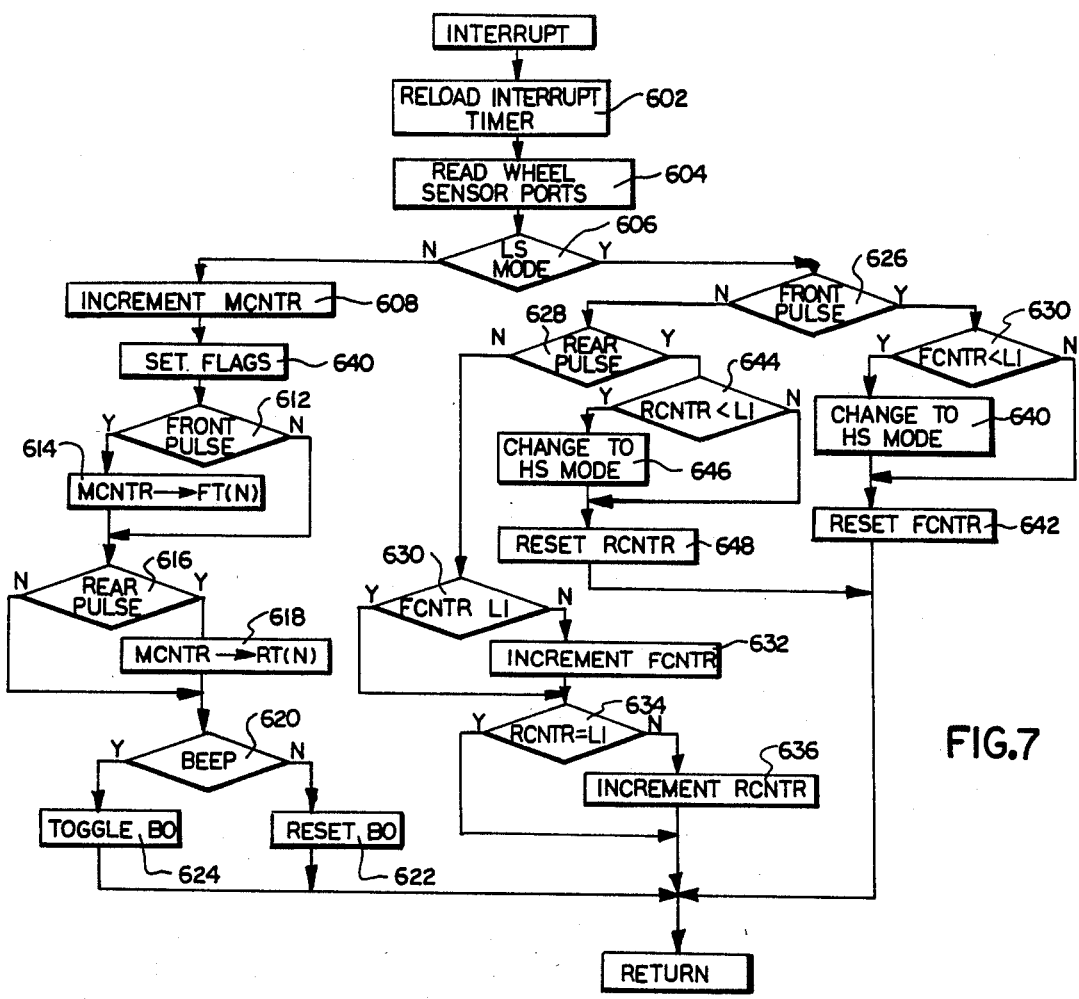

The firmware associated with the microprocessor 120 in FIG. 3 includes two major components: a main program (FIG. 4), and an interrupt servicing routine (FIG. 7). The main program performs the bulk of the processing required to generate the slip warning signal. The microprocessor continuously cycles through the main program, but is interrupted every 160 microseconds during the execution of the main program by the interrupt signal generated by the timer 128. Each time the microprocessor 120 is interrupted by the timer 128, it suspends execution of the main program shown in FIG. 4 and jumps to the interrupt servicing routine shown in FIG. 7.

The functions performed by the microprocessor during the interrupt servicing routine will be described in detail hereinafter with reference to FIG. 7. Generally, however, the functions may be divided into two categories:

(1) If the system is in what is known as a low speed or "LS" mode, the microprocessor executes a branch of the interrupt servicing routine wherein the microprocessor examines the interval between successive pulses provided by the sensors 146 and 162, switching the system to the high speed mode if the interval is less than an amount corresponding to a vehicle speed of 25 kilometers per hours.

(2) If the system is in the high speed (HS) mode, the microprocessor executes a branch of the interrupt servicing routine wherein (a) a main counter MCNTR, similar in function to the counter 64 of FIG. 2, is incremented, (b) the value of a variable FT(N) is set equal to the current value of MCNTR if a pulse is detected by the front sensor 162, and (c) a variable RT(N) is set equal to the current value of MCNTR if a pulse is detected by the rear sensor.

As long as the vehicle is traveling in excess of 25 kilometers per hour, the interrupt servicing routine will thus spend the majority of its time searching for front and rear sensor pulses, and will record the value of the main counter MCNTR at the time of each. Since the interrupt servicing routine occurs so frequently, however, most often the interrupt servicing routine will not detect either a front or rear wheel pulse, hence no value will be recorded. Even at highway speeds of 100 kilometers per hour, approximately 70 milliseconds is still required for a wheel to complete one full revolution. During that 70 millisecond interval, approximately 500 interrupts will occur and be processed. Thus, the main counter MCNTR will be incremented at least several hundreds of times during the time interval between consecutive pulses from the same rotation sensor.

FIG. 4 is a flow chart of the main program executed by the microprocessor 120. When power is applied to the system, a reset circuit 180 applies a pulse to the reset input of the microprocessor, causing it to begin programmed operation at a pre-established address within the read only memory. The reset address corresponds to the start location of FIG. 4.

Following the reset, the microprocessor performs the usual initialization routines 200, establishing the initial values of the various working registers of the microprocessor, performing initial housekeeping functions such as diagnostic procedures, and enabling the interrupt input to the microprocessor. The microprocessor also operates the buzzer and indicator lights momentarily to assure the operator that the system has begun operating normally, and initializes the system mode flag to the low speed mode. In the next step 204, the operating registers corresponding to the registers shown in FIG. 2 (RT(N) RT(N−1), FT(N), FT(N−1), and other registers used in intermediate stages of processing) are reset to prepare for entry into the main processing loop.

The beginning of the main processing loop is identified by the label MLOOP, and begins with step 206. In step 206, the microprocessor checks the timer to make sure that it is operating and that the interrupt input to the microprocessor is enabled. This is largely a precautionary step whose function is to restart the timer in the unlikely event that noise within the system causes it to spontaneously become disabled. In the next step 208, the microprocessor tests the internal mode flag to determine whether the system is operating in the high speed (HS) or low speed (LS) mode. (The system will be in the HS mode when the vehicle is cruising at normal highway speeds, and will be in the LS mode otherwise.) If the system is in the low speed mode, the microcomputer proceeds on to step 210. In step 210, a "two turns" counter is reset. The "two turns" counter is used in another part of the main loop, described hereinafter, to insure that wheel slip is not calculated until data has been acquired for two full revolutions of the vehicle wheels after the system has switched to the high speed mode of operation. After step 210, the microprocessor jumps back to step 204.

As long as the system remains in the low speed mode, it will continue to cycle through the steps 204, 206, 208 and 210. If the vehicle speeds up, however, the system will be switched to a high speed mode of operation during servicing of one of the timer interrupts. Thus, at some point the microprocessor will reach step 208, and will find that the system has been switched to the high speed mode. At that point, program flow will jump to step 212.

In step 212, an internal front sensor pulse flag is checked to determine whether there has been a pulse from the front sensor since the last time that the microprocessor passed through step 212. If there has been no front pulse, the microprocessor proceeds on to step 214, where a similar check for a rear wheel sensor pulse is performed. If there has also been no rear wheel sensor pulse, the microprocessor continues on with step 216, thereafter returning to the point in the program (step 206) identified by the label MLOOP.

Step 216 is included to cause the buzzer 108 and indicator lights 110 and 112 to rapidly switch on and off when the slip warning flag is high. In step 216, the value of one of the middle ordered bits of the current value of MCNTR is read and applied to the driver transistors 142 and 144 through port 132. Since the MCNTR bit toggles on and off periodically as MCNTR continues to count, the lights will similarly blink on and off. The same bit value is stored as a "beep" flag, used in step 620 of the interrupt servicing routine of FIG. 7 to control the buzzer 108.

The front and rear wheel sensor pulse flags are set by the interrupt servicing routine. Each time the microprocessor is interrupted by the timer 128, it checks for a front or a rear sensor pulse. If a pulse is found, the current MCNTR value is stored as either RT(N) or FT(N), as appropriate, and the corresponding sensor pulse flag is set to indicate that new pulse data is available for processing by the main loop.

When, in examining the sensor pulse flags in steps 212 or 214, it is found that a front or a rear pulse has occurred since the last time that steps 212 or 214 of the program were executed, the microprocessor jumps to the data processing branches of the main program.

Figure 5:
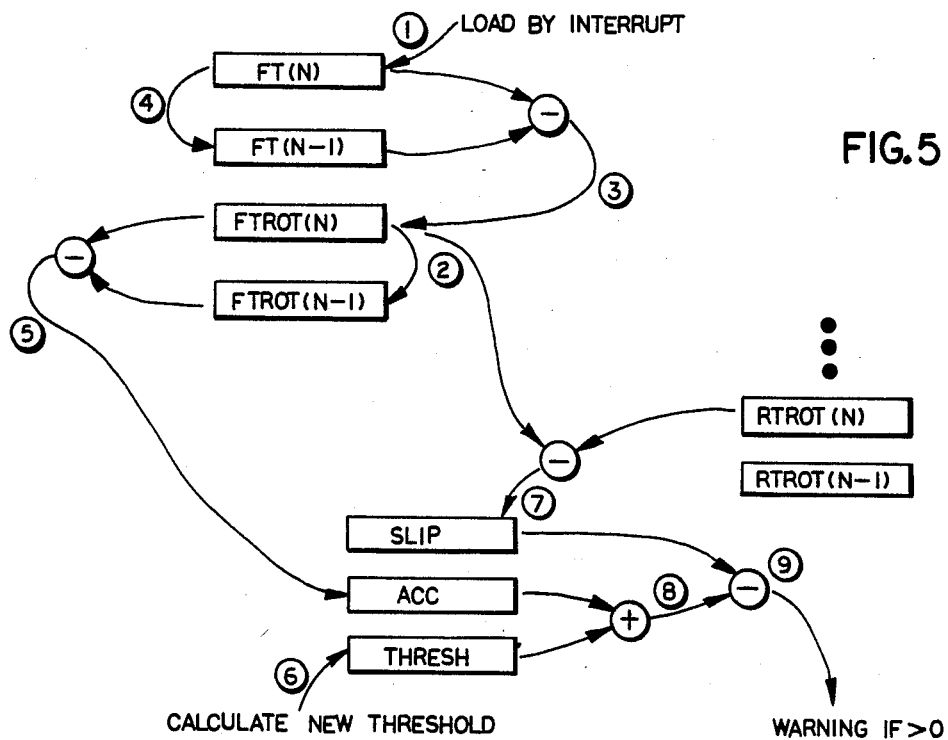
FIG. 5 is a schematic representations of various memory locations used by the microcomputer for the storage of variable values, also showing the manner in which the data within various locations is manipulated in one branch of the flow chart of FIG. 4.

FIG. 5 is a schematic illustration of the fashion in which data is stored and manipulated by the microprocessor during the front wheel pulse processing branch (steps 250-264 and step 400) of the main loop. In FIG. 5, each rectangular block represents a storage location within the random access memory 126 of FIG. 3. Each of the illustrated storage locations is two bytes wide, and stores a value of a corresponding system variable. (The variables are listed, above, in Table I.) The circled arithmatic signs represent the arithmetic data manipulations performed by the firmware routine, and the arrows pointing to and from the circled arithmatic signs identify the sources of the information used in the arithmetic operation and the destination of the results of the arithmetic process. The circled numbers in FIG. 5 represent the order in which the various steps are performed during the execution of the main loop. FIG. 5 will not be separately described, but should be consulted in considering the following description of the pulse processing branches of the main loop of FIG. 4.

In the main program of FIG. 4, the microprocessor jumps to step 250 if it is determined in step 212 that a pulse has been received from the front sensor. In step 250, the "front pulse" flag is cleared. Succeeding passes through program step 212 will therefore not be diverted to step 250 until such time as the next front pulse occurs.

Also in step 250, the current value of the "front wheel time of rotation" variable FTROT(N) is loaded into the memory location used for the old value of the same variable (FTROT(N−1)). A new front wheel time of rotation is then calculated by subtracting the value of the main counter at the time of the preceeding front wheel pulse (FT(N−1)) from the value of the main counter at the time of the most recent front wheel pulse (FT(N)). The result of the subtraction process is loaded into the memory location for the variable representing the most recent front wheel time of rotation (FTROT(N)). Then, the current value of the variable FT(N) is loaded into the memory location storing the previous value of the same variable, FT(N−1), thereby freeing the FT(N) memory location to be loaded with new data upon the occurrence of the next front sensor pulse.

In step 252, the microprocessor examines the value of the "two turns" counter. If the two turns counter contains a value less than 2, the microprocessor increments the turns counter in step 254, and returns to the main loop at the point labelled MLOOP. As stated previously, the purpose of the "two turns" counter (and steps 252 and 254) is to insure that at least two full revolutions of the vehicle tires have been completed before wheel slip is calculated. Only then will all of the systems variables have acquired meaningful values. If it is determined in step 252 that two full turns of the vehicle tires have been completed since the system last switched to the high speed mode of operation, program flow proceeds to step 256.

Figure 6:
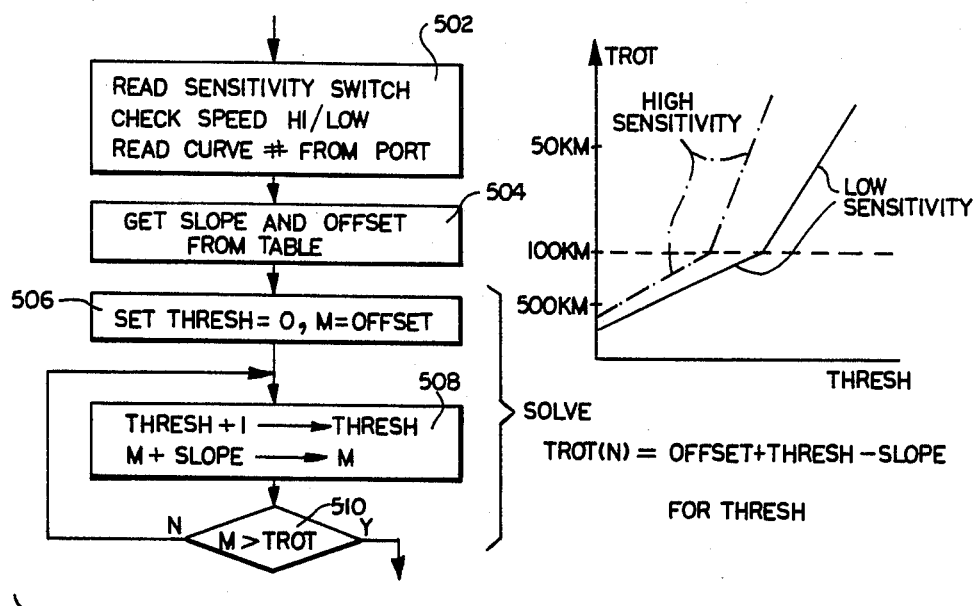
FIG. 6 is a more detailed flow chart illustrating the operations performed in one part of the flow chart of FIG. 4; and, FIG. 7 is a flow chart illustrating the interrupt servicing routine performed by the microcomputer in the FIG. 3 embodiment.

In step 256, the current front wheel time of rotation FTROT(N) is compared with a constant representative of a speed of 35 kilometers per hour. If the current value of FTROT(N) is less than the limit, then the speed of the vehicle is greater than the limit of 35 miles per hour and program execution proceeds on to step 258. In step 258, front wheel acceleration is calculated by subtracting the previous front wheel time of rotation from the current front wheel time of rotation. The resulting acceleration signal is then loaded into the memory location designated to contain the acceleration variable. A threshold value is also calculated in step 258. The steps involved in the calculation of the threshold value are shown in FIG. 6, and will be described hereinafter with reference to that Figure.

If it is determined in step 256 that the speed of the front wheel of the vehicle is less than 35 kilometers per hour, program execution jumps to steps 260, 262 and 264. Steps 260, 262 and 264 are included to determine whether the system should be switched into the low speed or "LS" mode of operation. In step 260, the current time of rotation of the front wheel (FTROT(N)) is compared with a limit corresponding to a vehicle speed of 20 kilometers per hour. If the time of rotation is less than the limit, then the speed of the vehicle is greater than 20 kilometers per hour. In this event, the microprocessor remains in the high speed mode, but returns to the point in the program labelled MLOOP. If the speed of the front wheel is below 20 kilometers per hour, however, program execution proceeds on to step 262. In step 262, the current rear wheel time of rotation RTROT(N) is compared against the same 20 kilometer per hour limit used in step 260. If the rear wheel time of rotation is less than the limit, then the speed of the rear wheel is in excess of 20 kilometers per hour. In this event, the system again remains in the high speed mode of operation, but again returns to the point in the main program designated by the label MLOOP. If, however, it is determined in step 262 that the speed of the rear wheel is also less than 20 kilometers per hour, program execution proceeds on to step 264. In step 264 the system is switched to the low speed (LS) mode, and the main counter MCNTR is reset. Thereafter, program execution continues at the point in the main program designated by the label MLOOP.

Thus, steps 256, 260, and 262 function to place the system in the low speed mode of operation only when both the front and rear wheels of the vehicle are traveling at a rate of speed below 20 kilometers per hour. In all other circumstances the system remains in the high speed mode of operation, although certain portions of the signal processing are bypassed if the speed of the vehicle is between 20 and 35 kilometers per hour.

The sequence of steps 350-364 which are executed if a rear wheel pulse is detected are essentially the same as steps 252-264, except that rear wheel variables are used instead of front wheel values. The purpose of both sequences of steps is to derive a new value of acceleration (rear wheel acceleration in one case, front wheel acceleration in the other), a new value of current time of rotation for the respective tire, and a new threshold value. Having acquired this information in either step 258 or 358, the microprocessor jumps to step 400.

In step 400, reached through either step 258 or 358, the difference in rotation times of the front and rear tires is determined by subtracting RTROT(N) from FTROT(N). The difference is stored as a variable SLIP. A wheel slip reference value is then calculated by adding together the threshold signal THRESH and the acceleration signal ACC. The difference (DIFF) between the variable SLIP and the reference value is calculated and used to determine whether wheel slip is excessive.

If the DIFF value calculated in step 400 is greater than zero, the audible and visual alarms are turned on by setting the slip warning flag. If the DIFF value is less than zero, however, meaning that wheel slip is less than the sum of the threshold and acceleration values, then both alarms are instead turned off by resetting the slip warning flag. Program flow then returns to the main program at label MLOOP.

As stated previously, the threshold against which the difference in rotation times of the front and rear wheels is compared is calculated in each pass through either step 258 or 358. There are, of course, numerous different procedures which could be employed to calculate the threshold in steps 258 or 358. For example, the time of rotation of the free rolling wheel could merely be divided by an appropriate factor of two (i.e., be shifted right) as described previously with respect to FIG. 2. Preferably, however, a procedure such as that shown in FIG. 6 is instead employed.

In the procedure of FIG. 6, one of thirty-two different linear relationships between time of rotation and threshold will be selected, dependent upon three different factors:

(1) the position of the sensitivity switch 106 of FIG. 3, (2) whether the speed of the vehicle is above or below a selected breakpoint, and (3) the sensitivity select words hard wired into the inputs ports 134 and 136 of FIG. 3.

In essence, the digital number applied to the input port 134 of FIG. 3 selects two "high sensitivity" linear relationships between time of rotation and threshold (from a set of 16 available relationships), one for vehicle speeds above the breakpoint and another for speeds below the breakpoint. Similarly, the digital number applied to the input port 136 selects two "low sensitivity" linear relationships between time of rotation and threshold from among a different set of 16 available relationships. One of the four different linear relationships thus identified is then chosen in accordance with the position of the sensitivity switch (high or low sensitivity) and the decision as to whether the vehicle speed is above or below the breakpoint. A specific threshold value is then calculated from the chosen linear relationship.

In step 502, the three different criterion for selecting a linear relationship between time of rotation and threshold are examined. The sensitivity switch 106 is read by reading port 132, the time of rotation of the respective wheel (the front wheel when executing step 258 and the rear wheel when executing step 358) is compared with the breakpoint corresponding, for example, to a vehicle speed of 100 kilometers per hour, and the curve numbers are read from ports 134 and 136. These values are then used to address a ROM look-up table containing the slope and offset (Y-axis intercept) values defining a specific linear relationship between time of rotation and threshold. The remaining steps 506, 508, and 510 calculate the threshold from those values by solving the equation:

$$TROT(N) = OFFSET + THRESH*SLOPE$$

for the threshold value THRESH.

In step 506, the threshold variable is given an initial value of zero, and a temporary variable M is given an initial value equal to OFFSET. In step 508, the value of SLOPE is added to the variable M, and the current value of THRESH is incremented. In step 510, the variable M is compared with the time of rotation of the corresponding wheel (again, the front wheel in step 258 and the rear wheel in step 358). If the present value of the variable M is less than the time of rotation, program execution returns to step 508, wherein the threshold is incremented further and the temporary variable M is advanced by an amount equal to the variable SLOPE. The program will continue to cycle through steps 508 and 510 until such time as the temporary variable M does become greater than the time of rotation of the corresponding wheel. At that time the threshold variable THRESH has assumed the correct value, and program execution continues on with step 400.

FIG. 7 is a flow chart of the interrupt servicing routine performed by the microprocessor 120 each time its execution of the main program loop is interrupted by the timer 128. The interrupt is issued by the timer each time it overflows. When an interrupt first occurs, the microprocessor suspends execution of the main program loop, and jumps to the interrupt servicing routine at step 602. In step 602, the interrupt timer is reloaded with an initial value, and is then restarted to begin counting up from that initial value. The initial value is selected such that the timer will count for approximately 160 microseconds, for example, before generating the next interrupt signal. The timer will thus overflow at equal intervals of approximately 160 microseconds in the example being described.

In the next step 604, the microprocessor reads the outputs of the signal processing circuits 102 and 104 of FIG. 3 by reading the port 132. The states of the output signals of circuits 102 and 104 are compared with the states of the same signals at the time of the last interrupt. If either output signal has changed from a low to a high level in the interim, the sensor pulse flag for that wheel is set. The flag is not set, however, if the sensor output signal is now low, or if it is high now but was also high at the time of the last interrupt. The current states of the outputs of signal processing circuits 102 and 104 are then stored for use the next time the interrupting servicing routine is performed.

In step 606, the mode flag is examined to determine whether the system is currently operating in the low speed mode or the high speed mode. If the system is currently operating in the low speed mode, program execution branches to the series of steps 626-648. The principal purpose of steps 626-648 is to determine whether or not the system should be switched to the high speed mode of operation. That branch will be described hereinafter. If it is determined in step 606 that the system is currently operating in the high speed mode, however, program execution continues with step 608.

In step 608, the two-byte value of the variable MCNTR is incremented. Because of step 608, the main counter will be incremented once each 160 microseconds during normal, high speed mode operation.

In step 610, the front and rear wheel pulse flags used by the main program in steps 212 and 214 are set in accordance with the results of step 604. If there has been a front pulse (tested in step 612), the current value of the main counter MCNTR is stored (step 614) in the memory location for the variable FT(N), representing the time of occurrence of the most recent front wheel pulse. Similarly, if there has been a rear wheel pulse (step 616), the current value of the main counter MCNTR is stored (step 618) in the memory location containing the variable RT(N), representing the time of occurrence of the most recent rear wheel pulse.

In step 620, the microprocessor examines the flag indicating whether the slip warning is currently being given. If the slip warning is not being given, the microprocessor proceeds on to step 622, wherein the bit $B_O$ controlling the audible alarm is reset and the reset bit is loaded into the appropriate bit position of port 132. If the slip warning is currently being given, however, (having been set in step 400, FIG. 4) the microprocessor jumps to step 624. In step 624 the current value of the bit $B_O$ is toggled, and the toggled bit is loaded into port 132. In other words, if the bit $B_O$ currently has a value of zero, then it is set to a value of one, whereas if it currently has a value of one, then it is reset to a value of zero. Because of step 624, the bit $B_O$ will be periodically turned on and off, causing an AC signal to be applied to the buzzer 108 of FIG. 3. After steps 622 and 624, program flow returns to the execution of the main program at the point of interruption.

The program branch including steps 626-648 is executed whenever it is determined in step 606 that the system is operating in the low speed mode of operation. In step 626, the microprocessor tests to determine whether a front pulse has occurred. Program flow continues on to step 628 if a front pulse has not occurred. In step 628 it is determined whether a rear pulse has occurred. If no rear pulse has occurred, program flow proceeds on to step 630-636.

Steps 630-636 deal with the incrementing of two counters which are used by the program only during the low speed mode of operation. One of the counters FCNTR (front wheel counter) is used to measure the time between pulses for the front wheel, whereas the other counter RCNTR (rear wheel counter) is used to measure the time between pulses for the rear wheel. The main counter is not used to measure times of rotation at low speeds since at low speeds it is possible for the main counter to overflow once, twice, or even more times between consecutive sets of pulses. It is thus difficult to obtain an unambiguous reading from the main counter as to the actual time interval between successive pulses.

The front counter FCNTR is incremented in step 632 if it is determined in step 630 that the front counter value has not yet reached the terminal count of L1 (corresponding to a vehicle speed of 25 km/hr). Similarly, the rear counter RCNTR is incremented in step 636 if it is determined in step 634 that the rear counter has also not reached the terminal count limit of L1. The decision step 630 and 634 cause bypassing of the counter incrementing steps when each counter reaches its terminal count value of L1. This eliminates the problem of counter overflow which would otherwise exist when the vehicle is traveling at very low speeds, or is stopped. After steps 634 and 636, the microprocessor leaves the interrupt servicing routine, returning to the main program at the point of interruption.

If it is determined back in step 626 that a front wheel pulse has occurred, however, the microprocessor proceeds to step 630, wherein the current value of the front counter FCNTR is compared with the terminal limit of L1. If the value of FCNTR is less than L1, meaning that the speed of the vehicle is in excess of 25 kilometers per hour, the microprocessor proceeds on to step 640. In step 640 the system mode flag is changed to place the system in the high speed mode. In the succeeding step 642, the front counter FCNTR value is reset to zero. If it is determined in step 638 that the front counter value is not less than the terminal count of L1, however, then the program bypasses step 640, thereby remaining in the low speed mode, and proceeds directly to step 642 and the resetting of the front counter.

A sequence of steps similar to steps 630–642 is performed if it is determined in step 628 that a rear wheel pulse has occurred. More particularly, the current value of the rear wheel counter RCNTR is compared with the 25 kilometer per hour limit L1 in step 644. If the RCNTR value is less than L1, the system is switched to the high speed mode of operation in step 646. Thereafter, the rear counter is reset in step 648. If the rear counter value is not less than the terminal count of L1, however, the program flow bypasses step 646, proceeding directly to step 648 and the resetting of the rear counter RCNTR. Again, the program leaves the interrupt servicing routine following the execution of step 642 or 648, returning to the main program at the point of interruption.

A wheel slip detector has thus been described which is both inexpensive and easy to mount on a vehicle, and yet which provides a reliable indication of excessive wheel slip, even in the presence of vehicle acceleration.

Although the invention has been described with respect to a preferred embodiment, it will be appreciated that various rearrangements and alterations of parts may be made without departing from the spirit and scope of the present invention, as defined in the appended claims.

What is claimed is:

1. Apparatus for detecting slip between a surface and a driven wheel in contact with said surface by comparing speed of a driven wheel with speed of a free rolling wheel also in contact with said surface, comprising
   driven wheel sensing means for providing a first electrical signal each time said driven wheel passes through one discrete rotational position,
   free rolling sensing means for providing a second electrical signal each time said free rolling wheel passes through one discrete rotational position, and
   processing means responsive to said first and second electrical signals for providing a wheel slip indication whenever a difference between a time interval separating successive first electrical signals and a time interval separating successive second electrical signals exceeds a sum of a selected threshold time interval and acceleration time interval of said wheels over a period of time, wherein said processing means comprises microcomputer means programmed to measure the time interval (T1) between the Nth and N−1 pulses of one of said wheels, the time interval (T2) between N−1 and N−2 pulses of the same wheel, and the time interval (T3) between two successive pulses of the other wheel occurring between said Nth and N−2 pulses, and to determine the difference (D1) between T1 and T2 for use as a measure of said acceleration time interval, and to utilize said time interval measurements (T1–T3) and said difference (D1) to generate said wheel slip indication.

2. Apparatus as set forth in claim 1, wherein said processing means includes means for selecting a threshold as a function of the rotation time of one of said wheels such that the threshold diminishes as wheel speed increases.

3. Apparatus as set forth in claim 1 wherein each of said sensing means includes a single magnet affixed to the corresponding wheel, and a sensing coil disposed adjacent said wheel for sensing the passage of said magnet once in each revolution of said wheel, whereby each said coils provides only one said electrical signal in each full revolution of the corresponding said wheel.

4. Apparatus as set forth in claim 1, wherein said microcomputer means is further programmed to determine the difference (D2) between T3 and one of the other said time interval measurements T1 or T2, and to provide said wheel slip indication whenever said difference D2 exceeds the sum of said difference D1 and said selected threshold.

5. Apparatus as set forth in claim 4, wherein said microcomputer means is further programmed to select a threshold as a function of wheel speed.

6. Apparatus as set forth in claim 5, wherein said microcomputer means includes a digital memory having data stored therein defining a plurality of relationships between threshold and wheel speed, said apparatus further comprising means for causing said microcomputer to select one of said relationships for use in providing said wheel slip indication.

7. A method for detecting slip between a surface and a driven wheel in contact with said surface, comprising the steps of
   determining a time necessary for said driven wheel to rotate one full turn,
   determining a time necessary for a free rolling wheel in contact with the same surface to rotate one full turn,
   determining the extent to which one of said wheels has accelerated during a time interval including the wheel turns over which said driven wheel and free rolling wheel rotation times were measured, and
   providing a wheel slip indication whenever a difference between said driven wheel and free rolling wheel rotation times exceeds a sum of said acceleration time interval and a selected threshold time interval, wherein said step of determining the extent to which one of said wheels has accelerated comprises the steps of storing the rotation time of a wheel as measured in one of said time determining steps, and after said time determining step is next performed for the same wheel, subtracting said stored rotation time from the newly determined said rotation time to thereby provide a signal indicative of the extent to which said wheel has accelerated.

8. A method as set forth in claim 7, wherein said step of determining the time necessary for said driven wheel to rotate one full turn comprises the steps of providing an electrical pulse each time one discrete point on said driven wheel rotates past a point rotationally fixed with respect to said driven wheel, and measuring the time interval between successive said electrical pulses.

9. A method as set forth in claim 7, wherein said step of providing a wheel slip indication includes the step of establishing a threshold having a value dependent upon the speed of rotation of at least one of said wheels.

10. A method as set forth in claim 9, wherein said step of establishing a threshold comprises the steps of selecting one of a plurality of functional relationships between said speed of rotation and said threshold, and calculating a specific threshold from said selected functional relationship and said speed of rotation.

11. A method of detecting slip between a driven wheel in contact with said surface, comprising the steps of
providing a first indication each time said driven wheel passes through one discrete rotational position,
providing a second indication each time a free rolling wheel in contact with the same said surface passes through one discrete rotational position, and,
upon each occurrence of a said first or second indication
determining the time interval which has elapsed since the last time the same said wheel provided said indication,
subtracting the current time interval from a previous time interval from the same wheel so as to provide a first difference representative of acceleration of said wheel,
subtracting the current time interval from the most recent time interval from the other wheel so as to provide a second difference representative of the difference in rotation rates of said wheels, and
providing a wheel slip indication if the second difference exceeds the sum of a threshold and said first difference.

12. Wheel slip warning apparatus adapted for retrofit with an existing vehicle having at least one driven wheel and one free rolling wheel for warning an operator of an incipient wheel slip condition by comparing speed of said driven wheel with that of said free rolling wheel, comprising:
rotation sensor means for each said wheel including a first means adapted to be mounted on a said wheel for rotation therewith and a second means cooperating with said first means and adapted to be mounted on said vehicle in proximity to a said wheel such that second means produces a single electrical pulse for each revolution of said wheel,
wheel slip detector circuitry connected to said second means of said free rolling wheel and to said second means of said driven wheel for detecting wheel slip, said detector circuitry including means for indicating a wheel slip condition whenever a difference between a first time interval separating successive electrical pulses from a first said wheel and a second time interval separating successive electrical pulses from a second said wheel exceeds a sum of a selected threshold and a difference between two said first time intervals, and
alarm means responsive to a said wheel slip condition indication for providing a warning to said operator of a said wheel slip condition.

13. Apparatus as set forth in claim 12 wherein each said first means comprises a single magnet adapted to be mounted to a said wheel for rotation therewith and each said second means includes a sensing coil mounted on said vehicle adjacent said wheel for sensing the passage of a said magnet once in each revolution of said wheel, whereby each said coil provides only one said electrical signal in each full revolution of the corresponding said wheel.

* * * * *